United States Patent
Resnick Kossnick et al.

(10) Patent No.: US 11,232,477 B1
(45) Date of Patent: Jan. 25, 2022

(54) SOURCING GOODS BASED ON PRE-FEATURE ANALYTICS

(71) Applicant: GROUPON, INC., Chicago, IL (US)

(72) Inventors: Rebecca Abigail Resnick Kossnick, San Francisco, CA (US); Matt Wheeler, Mountain View, CA (US); Sudarshan Seshadri, Mountain View, CA (US); Mehul Shah, Fremont, CA (US)

(73) Assignee: Groupon, Inc., Chicago, IL (US)

( * ) Notice: Subject to any disclaimer, the term of this patent is extended or adjusted under 35 U.S.C. 154(b) by 455 days.

(21) Appl. No.: 14/539,937

(22) Filed: Nov. 12, 2014

Related U.S. Application Data

(63) Continuation of application No. 14/446,088, filed on Jul. 29, 2014, now abandoned.

(60) Provisional application No. 61/860,219, filed on Jul. 30, 2013.

(51) Int. Cl.
*G06Q 30/00* (2012.01)
*G06Q 30/02* (2012.01)
*G06N 20/20* (2019.01)

(52) U.S. Cl.
CPC ......... *G06Q 30/0246* (2013.01); *G06N 20/20* (2019.01)

(58) Field of Classification Search
CPC .......... G06Q 30/0201; G06Q 30/0202; G06Q 30/0242; G06Q 30/0246; G06Q 30/0211
See application file for complete search history.

(56) References Cited

U.S. PATENT DOCUMENTS

| | | | | |
|---|---|---|---|---|
| 8,620,707 | B1 * | 12/2013 | Belyi | G06Q 10/087 705/28 |
| 2001/0049690 | A1 * | 12/2001 | McConnell | G06Q 10/087 |
| 2002/0123930 | A1 * | 9/2002 | Boyd | G06Q 30/02 705/14.13 |
| 2002/0161779 | A1 * | 10/2002 | Brierley | G06Q 30/02 |
| 2005/0189415 | A1 * | 9/2005 | Fano | G06Q 10/087 235/383 |
| 2009/0006184 | A1 * | 1/2009 | Leach | G06Q 30/02 705/7.32 |
| 2010/0287029 | A1 * | 11/2010 | Dodge | G06Q 30/0202 705/7.31 |
| 2011/0225035 | A1 * | 9/2011 | Patwa | G06Q 30/02 705/14.41 |
| 2012/0023043 | A1 * | 1/2012 | Cetin | G06Q 30/02 706/12 |
| 2013/0085869 | A1 * | 4/2013 | Carlson | G06Q 30/0226 705/14.72 |

(Continued)

FOREIGN PATENT DOCUMENTS

| | | | | |
|---|---|---|---|---|
| CA | 2307484 A1 * | 11/2000 | | G06Q 30/0601 |

OTHER PUBLICATIONS

Charles R. Kelley, What is Adaptive Training, 1969, Human Factors, pp. 547-556, journals.sagepub.com (Year: 1969).*

*Primary Examiner* — Naresh Vig
(74) *Attorney, Agent, or Firm* — Alston & Bird LLP

(57) ABSTRACT

In general, embodiments of the present invention provide systems, methods and computer readable media for collecting pre-feature data for a promotion, performing analytics on the pre-feature data, predicting the promotion sales velocity based on applying an odds model to the pre-feature data, and determining a quantity of goods to source based at least in part on the promotion sales velocity.

13 Claims, 4 Drawing Sheets

(56) References Cited

U.S. PATENT DOCUMENTS

| | | | |
|---|---|---|---|
| 2014/0089092 A1* | 3/2014 | Kilmer | G06Q 30/0269 705/14.58 |
| 2014/0122178 A1* | 5/2014 | Knight | G06Q 30/0202 705/7.31 |
| 2014/0156348 A1* | 6/2014 | Sinkel | G06Q 30/0605 705/7.31 |
| 2015/0127438 A1* | 5/2015 | Wedderburn | G06Q 30/02 705/14.16 |

* cited by examiner

SOURCING GOODS BASED ON PRE-FEATURE ANALYTICS

CROSS-REFERENCE TO RELATED APPLICATIONS

This application is a continuation of U.S. application Ser. No. 14/446,088, entitled "SOURCING GOODS BASED ON PRE-FEATURE ANALYTICS," and filed Jul. 29, 2014, and claims the benefit of U.S. Provisional Application No. 61/860,219, entitled "SOURCING GOODS BASED ON PRE-FEATURE ANALYTICS," filed Jul. 30, 2013, the entire contents of which are hereby incorporated by reference.

FIELD

Embodiments of the invention relate, generally, to using pre-feature analytics in sourcing goods that are offered in promotions.

BACKGROUND

Current methods for sourcing goods that are offered in promotions exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for collecting pre-feature data for a promotion, performing analytics on the pre-feature data, predicting the promotion sales velocity based on applying an odds model to the pre-feature data, and determining a quantity of goods to source based at least in part on the promotion sales velocity.

In general, one aspect of the subject matter described in this specification can be embodied in methods that include the actions of receiving, from an impressions data repository, pre-feature data describing the promotion; generating, by a processor, an analysis of the pre-feature data; generating, by a pre-feature analysis module, an estimated sales velocity for the promotion based on applying an odds model to the analyzed pre-feature data; and determining the quantity of the goods to source based on the estimated sales velocity.

These and other embodiments can optionally include one or more of the following features. The pre-feature data may include consumer responses to an impression of the promotion that was distributed by a promotion and marketing service to a selected set of consumers prior to the first day that the promotion is launched; and at least one of promotion permalink, promotion launch date, promotion duration, total quantity of the goods sold, quantity of goods sold after 14 hours since the promotion launch, quantity of goods sold after 36 hours since the promotion launch, average price of the goods sold, QPM after 36 hours since the promotion launch, quantity of position 1 impressions given on the promotion launch date, number of position 1 impressions given after the promotion launch date, and all impressions not in position 1 given after the promotion launch date. The pre-feature data may include a demographic analysis of the set of consumers to whom the impression was distributed. An impression of the promotion may be included in a set of impressions that are distributed as content describing available promotions. The content may be email content, and the pre-feature data may include email-only attributed quantity of the goods sold after 36 hours since the promotion launch.

Generating an estimated sales velocity for the promotion based on applying an odds model to the analyzed pre-feature data may include the actions of generating, by the odds model, a predicted value of the promotion using a quantity of pre-feature sales and a velocity multiplier that is a function of the promotion price and the promotion duration. The odds model may further include a tuning parameter that calibrates the predicted value of the promotion with a baseline model for predicting promotion value that is based on total quantity of goods sold per day. In embodiments in which he impression of the promotion is distributed only as email content, the odds model may further include a scaling parameter that corrects for quantity of the goods sold between an email-only-attributed quantity of the goods sold and total quantity of the goods sold. The odds model may be derived using supervised learning to adapt a trainable function.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3:
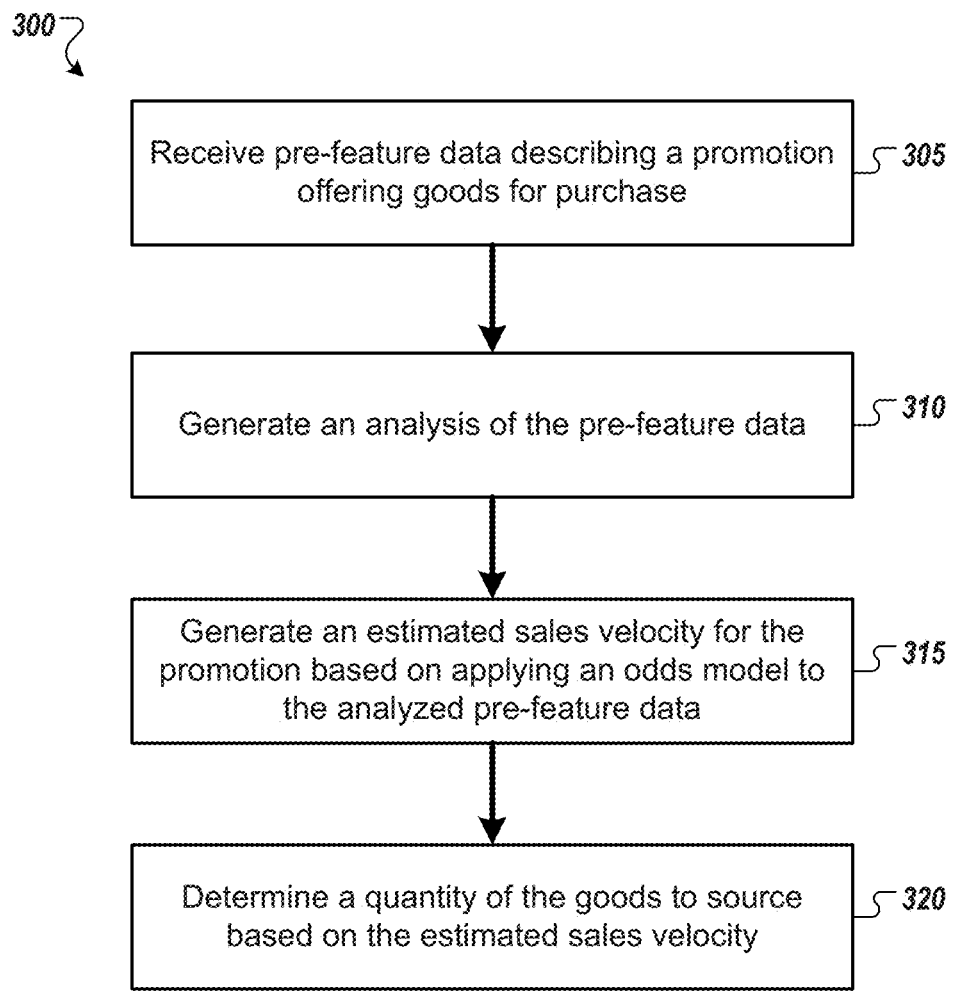
Figure 4:
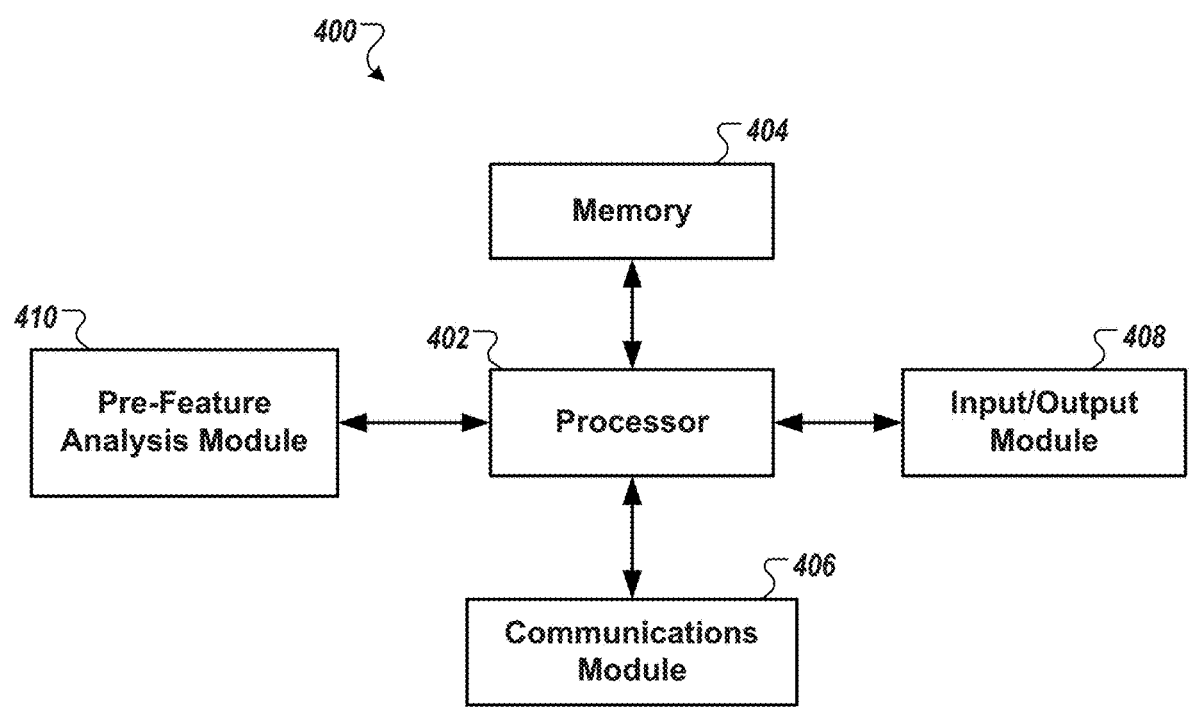

FIG. 3 is a flow diagram of an example method for determining a quantity of promotion goods to source based on predicted sales velocity of the promotion in accordance with some embodiments discussed herein; and FIG. 4 illustrates a schematic block diagram of circuitry that can be included in a computing device, such as a pre-feature analysis module, in accordance with some embodiments discussed herein.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

The term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

The term "instrument" may be used to refer, without limitation, to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the terms "promotion," "offer," "deal" and similar terms may be used interchangeably to refer, without limitation, to any type of offered, presented or otherwise indicated reward, discount, coupon, credit, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

As used herein, the term "instrument" may be used, without limitation, to refer to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

As used herein, the terms "consumer" and "customer" may be used interchangeably to refer, without limitation, to a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

Prior to launching a particular merchant's promotion for goods, a promotion and marketing service sources and warehouses a quantity of those goods from the merchant. When a consumer purchases the promoted goods in response to one of the promotion and marketing service's impressions, the promotion and marketing service completes the purchase by sending one or more of the quantity of warehoused goods to the consumer. For example, and using the running company promotion as an example, a promotion and marketing service will source and warehouse a particular quantity of pairs of running shoes from the running company prior to offering impressions of the running shoes promotion to consumers. When a consumer purchases running shoes in response to one of the impressions, the promotion and marketing service will extract the purchased running shoes from the warehoused inventory of running shoes and send them to the consumer.

It is important to ensure that an optimal quantity of goods is sourced. If the sourced quantity is too low, the promotion and marketing service's warehoused inventory of goods will be insufficient for fulfillment of the consumers' orders through the promotion. Additional inventory may have to be ordered from the merchant, resulting in decreased quality of customer service, e.g., delays in receiving purchased goods from the promotion and marketing service. If the sourced quantity is too high, a surplus of warehoused goods will remain after the promotion expires. This surplus will result in a devaluation of the promotion for the promotion and marketing service and/or the merchant.

In some embodiments, the quantity of goods to be sourced from a merchant is based at least in part on projections of the overall performance of the promotion in which the goods are offered. In some embodiments, these projections include predictions of the sales velocity (e.g., number of sales per day) over the duration of the promotion. In some embodiments, predictions of the sales velocity of a promotion are based on an odds model applied to the promotion's pre-feature data.

As such, and according to some example embodiments, the systems and methods described herein are therefore configured to collect pre-feature data for a promotion, perform analytics on the pre-feature data, predict the promotion sales velocity based on applying an odds model to the pre-feature data, and determining a quantity of goods to source based at least in part on the promotion sales velocity.

Figure 1:
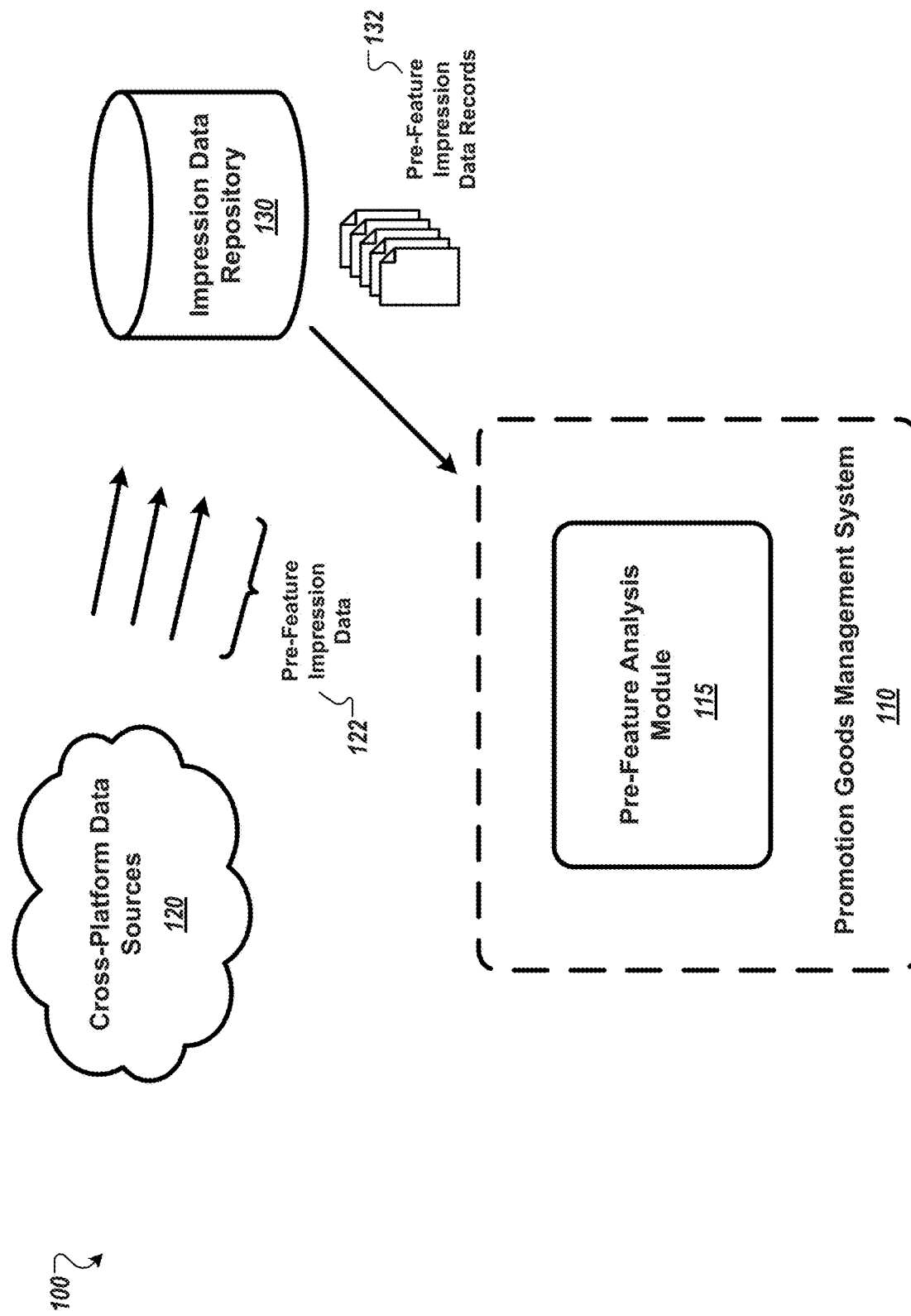
FIG. 1 illustrates an example scenario that includes a promotion goods management system configured to implement determining a quantity of promotion goods to source based on projections of the overall performance of a promotion using the promotion's pre-feature data in accordance with some embodiments discussed herein.

FIG. 1 illustrates an example scenario 100 that includes a promotion goods management system 110 configured to implement determining a quantity of promotion goods to source based on projections of the overall performance of a promotion using the promotion's pre-feature data.

In some embodiments, impressions of the promotion are distributed to a subset of consumers by a promotion and marketing service prior to the first day that the promotion is offered, e.g., via the impression of the promotion being included in a set of impressions that are in the content of an email sent to the consumers. In some embodiments, the subset of consumers is selected at random from the consumer base of the promotion and marketing service. Additionally and/or alternatively, the subset of consumers may include consumers for whom the promotion is determined to be most relevant. In some embodiments, determination of a promotion's relevance to a consumer may be based on attributes of the promotion (e.g., type of goods being offered, promotion price, offered discount) and/or attributes of the consumer (e.g., gender, location, previous consumer behavior).

In embodiments, the pre-feature data describing a promotion include the collected data 122 describing the consumer responses to the distributed impressions of the promotion. In some embodiments, pre-feature impression data 122 may be collected from at least one data stream received by the promotion and marketing service from cross-platform data sources 120 representing instances of consumer engagement with the distributed impression content (e.g., instances in which a consumer opens a mobile application, clicks on and/or opens an email, and/or visits a website), and consumer activation state (e.g., instances in which a consumer makes a promotion purchase).

In embodiments, impression data records 132 may be generated using the collected impression data 122; in some embodiments, each data record respectively represents an instance of a particular consumer's interaction with the content of a particular impression. The generated impression data records are stored in an impression data repository 130.

In embodiments, promotion goods management system 110 includes a pre-feature analysis module 115 for generating projections of the overall performance of a promotion in which the goods are offered based on collected pre-feature data. In some embodiments, generating projections includes performing analytics on collected pre-feature data and predicting a promotion's sales velocity based on applying an odds model to the pre-feature data, both of which will be described in more detail with reference to method 300.

Figure 2:
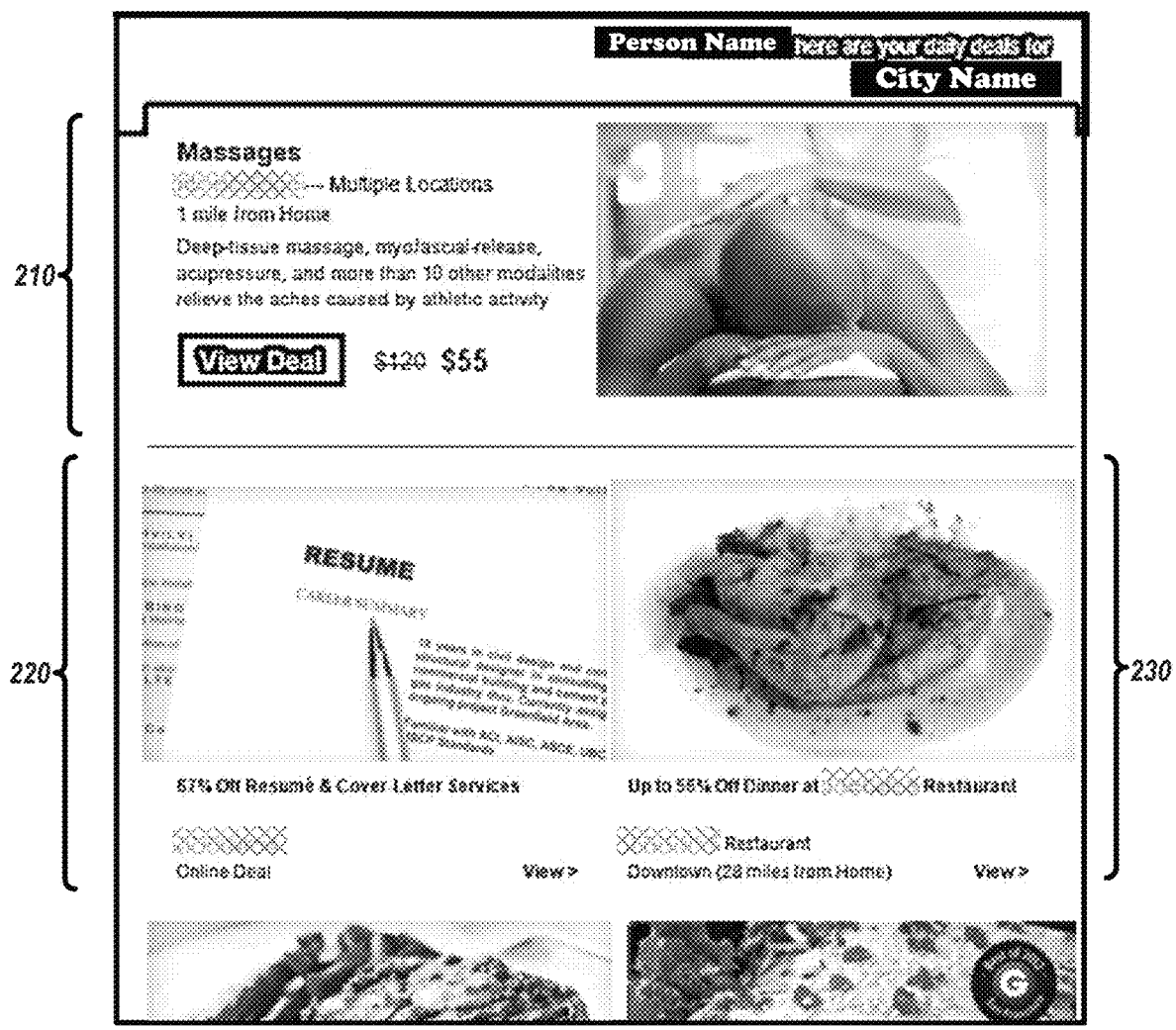
FIG. 2 illustrates an example email impression that has been sent from a promotion and marketing service to a particular consumer who is at a particular location in accordance with some embodiments discussed herein.

FIG. 2 illustrates an example email impression 200 that has been sent from a promotion and marketing service to a particular consumer (Person Name in this example) who is at a particular location (City Name in this example). The email content includes a set of graphics (210, 220, and 230), each graphic respectively representing a promotion that is available for purchase. Each of the graphics can include images and other descriptive material about a promotion (a "deal" in this example). Each graphic also can include an active link widget. In response to selection of an active link widget, the consumer can be directed (e.g., via a browser) to the promotion and marketing service's website where the consumer can examine additional details about and finalize a purchase of the promotion associated with the widget.

In embodiments, an impression 200 can have a custom configuration based on a ranking of the promotions identified as relevant to the recipient. Referring to example 200, the graphic that is displayed at the very top of the layout (i.e., the massages promotion 210) can represent a featured deal. In some embodiments, the featured deal 210 is the promotion that has been ranked as the promotion most likely to be of interest to the recipient, and its position (i.e., Position 1) in the layout of graphics is designed to emphasize this particular portion of the impression content to the recipient. In addition to being displayed alone at the top of the display (and thus most likely to be the first thing to be read by the recipient), the featured deal 210 graphic and its active link widget are rendered to be larger and thus more prominent.

FIG. 3 is a flow diagram of an example method 300 for determining a quantity of promotion goods to source based on predicted sales velocity of the promotion. For convenience, the method 300 will be described with respect to a system that includes one or more computing devices and performs the method 300. Specifically, the method 300 will be described with respect to processing of pre-feature impression data records by pre-feature analysis module 115.

In embodiments, the system receives 305 pre-feature data collected for a promotion offering goods for purchase. In some embodiments, the pre-feature data are received as pre-feature impression data records 132 that have been retrieved from an impression data repository 130. In some embodiments, the pre-feature data describe consumer responses to an impression of the promotion that was distributed by a promotion and marketing service to a selected set of consumers prior to the first day that the promotion is launched. In some embodiments, the promotion impression is included in a set of impressions that are distributed as email content describing available promotions, as previously described with reference to email impression 200. In some embodiments, the promotion impression may be featured within the email content (e.g., displayed in Position 1 at the top of the impressions content display pane).

In embodiments, the system generates 310 an analysis (e.g., feature extraction and, additionally or alternatively, statistical analyses of all or a combination of the data components) of the collected pre-feature data. For example, in some embodiments, pre-feature data collected from distributed email content may include at least some of the following attributes:

Permalink
Launch date
Duration of promotion
Email only attributed quantity sold after 36 hours of being launched
Total quantity sold
All quantity sold after 14 hours of being launched
All quantity sold after 36 hours of being launched
Average price
QPM after 36 hours of being launched
Number of position 1 impressions given on launch date
Number of position 1 impressions given after launch date
All impressions, not in position 1, given after launch date In some embodiments, the pre-feature data may further include a demographic analysis of the set of consumers to whom the impression was distributed.

In embodiments, the system generates 315 the predicted value of a promotion by applying an odds model to the analyzed pre-feature data. In some embodiments, the predicted value of a promotion may be an estimated sales velocity that is determined using an odds model based on the predicted total quantity of sales per day of the promotion, broken down by promotion duration and price.

In some embodiments, the odds model generates a sales velocity predicted value of a promotion according to Equation 1:

$$y\_i = \lambda * \kappa * q\_i * v(p,d) \quad \text{Equation 1}$$

where y_i is the predicted value of promotion i, q_i is the number of pre-feature sales, v(p,d) is the velocity multiplier as a function of price p, and duration d, λ is a scaling parameter, and κ is a tuning parameter.

In some embodiments in which the pre-feature data is collected only from email impressions (e.g., impression 200), the scaling parameter λ corrects for quantity of goods sold between the email-only attributed quantity sold and the total quantity sold.

In some embodiments, the tuning parameter κ calibrates the prediction with a baseline model for predicting promotion value based on total quantity of goods sold per day. The tuning parameter calibration offsets the extreme penalty that the baseline model may assign to estimates that result in a promotion goods management system 110 ordering a quantity of goods that is greater than the quantity that eventually are sold during the promotion.

In some embodiments, an odds model may be derived using supervised learning to adapt a trainable function. Examples of well-known trainable functions include classifiers, neural networks, and ensembles of trees. The selection of trainable function to use is not critical to the invention.

In embodiments, the training data set used to derive the odds model may include data describing consumer responses to impressions of promotions on their first launch day (Day 1, hereinafter). In some embodiments, each of the promotions represented in the training data may have response data that have been collected from at least a minimum number of impressions (e.g., 20,000 impressions) to ensure that a statistically valid comparison can be made across the promotions.

In some embodiments, the training data set may include data describing promotions' sales velocity. As an example, Table 1 illustrates an exemplary training data set containing instances representing the average percentage of total sales (in terms of promotion duration and price) 36 hours after launch for a group of promotions each having one of 3 promotion durations:

TABLE 1

Average percentage of total sales per promotion 36 hours after launch

| Promotion Duration | Greater Than or Equal to $25 | Less Than $25 |
|---|---|---|
| x Day Duration | a. 00% | d. 00% |
| y Day Duration | b. 00% | e. 00% |
| z Day Duration | c. 00% | f. 00% |

In embodiments, the system determines 320 a quantity of goods to source for a promotion based on the estimated sales velocity of the promotion.

FIG. 4 shows a schematic block diagram of circuitry 400, some or all of which may be included in various embodiments of the invention. As illustrated in FIG. 4, in accordance with some example embodiments, circuitry 400 can include various means, such as processor 402, memory 404, communications module 406, and/or input/output module 408. As referred to herein, "module" includes hardware, software and/or firmware configured to perform one or more particular functions. In this regard, the means of circuitry 400 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 404) that is executable by a suitably configured processing device (e.g., processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments processor 402 comprises a plurality of processors. The plurality of processors may be embodied on a single computing device or may be distributed across a plurality of computing devices collectively configured to function as circuitry 400. The plurality of processors may be in operative communication with each other and may be collectively configured to perform one or more functionalities of circuitry 400 as described herein. In an example embodiment, processor 402 is configured to execute instructions stored in memory 404 or otherwise accessible to processor 402. These instructions, when executed by processor 402, may cause circuitry 400 to perform one or more of the functionalities of circuitry 400 as described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. Alternatively, as another example, when processor 402 is embodied as an executor of instructions, such as may be stored in memory 404, the instructions may specifically configure processor 402 to perform one or more algorithms and operations described herein, such as those discussed in connection with FIG. 3.

Memory 404 may comprise, for example, volatile memory, non-volatile memory, or some combination thereof. Although illustrated in FIG. 4 as a single memory, memory 404 may comprise a plurality of memory components. The plurality of memory components may be embodied on a single computing device or distributed across a plurality of computing devices. In various embodiments, memory 404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 404 may be configured to store information, data (including analytics data), applications, instructions, or the like for enabling circuitry 400 to carry out various functions in accordance with example embodiments of the present invention. For example, in at least some embodiments, memory 404 is configured to buffer input data for processing by processor 402. Additionally or alternatively, in at least some embodiments, memory 404 is configured to store program instructions for execution by processor 402. Memory 404 may store information in the form of static and/or dynamic information. This stored information may be stored and/or used by circuitry 400 during the course of performing its functionalities.

Communications module 406 may be embodied as any device or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device, such as, for example, a second circuitry 400 and/or the like. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications with another computing device. Communications module 406 may be configured to receive and/or transmit any data that may be stored by memory 404 using any protocol that may be used for communications between computing devices. Communications module 406 may additionally or alternatively be in communication with the memory 404, input/output module 408 and/or any other component of circuitry 400, such as via a bus.

Input/output module 408 may be in communication with processor 402 to receive an indication of a user input and/or to provide an audible, visual, mechanical, or other output to a user. Some example visual outputs that may be provided to a user by circuitry 400 are discussed in connection with FIG. 1. As such, input/output module 408 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 400 is embodied as a server or database, aspects of input/output module 408 may be reduced as compared to embodiments where circuitry 400 is implemented as an end-user machine or other type of device designed for complex user interactions. In some embodiments (like other components discussed herein), input/output module 408 may even be eliminated from circuitry 400. Alternatively, such as in embodiments wherein circuitry 400 is embodied as a server or database, at least some aspects of input/output module 408 may be embodied on an apparatus used by a user that is in communication with circuitry 400, such as for example, pharmacy terminal 108. Input/output module 408 may be in communication with the memory 404, communications module 406, and/or any other component(s), such as via a bus. Although more than one input/output module and/or other component can be included in circuitry 400, only one is shown in FIG. 4 to avoid overcomplicating the drawing (like the other components discussed herein).

Pre-feature analysis module 410 may also or instead be included and configured to perform the functionality discussed herein related to the pre-feature analysis discussed above. In some embodiments, some or all of the functionality of pre-feature analysis may be performed by processor 402. In this regard, the example processes and algorithms discussed herein can be performed by at least one processor 402 and/or pre-feature analysis module 410. For example, non-transitory computer readable media can be configured to store firmware, one or more application programs, and/or other software, which include instructions and other computer-readable program code portions that can be executed to control each processor (e.g., processor 402 and/or pre-feature analysis module 410) of the components of system 400 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of pre-feature analysis. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 402 and/or pre-feature analysis module 410 discussed above with reference to FIG. 4, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 404) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for determining a quantity of goods to source for a promotion offering the goods for purchase, the method comprising:

adaptively training, by a processor of a pre-feature analysis module, a machine learning odds model based on historical sales velocity data until tuning criteria for the machine learning odds model is satisfied, wherein the historical sales velocity data corresponds to a historical number of sales per day over one or more promotion durations;

receiving, by the processor, pre-feature data describing a pre-feature impression of the promotion that was distributed to a selected subset of consumer devices associated with a selected subset of consumers based on at least one of attributes of the promotion and attributes of the consumers during a pre-feature duration in a limited distribution of the promotion to only the selected subset of consumers, pre-launch and prior to a full distribution of the promotion, wherein the promotion is indicative of a promotional value that upon purchase or acceptance results in issuance of an instrument configured to be used toward at least a portion of the purchase of the goods defined by the promotion;

wherein the promotion is optimized based on the attributes of the consumers and the attributes of the promotion by being selected based on at least one of type of goods being offered, promotion price, offered discount, gender of the consumers, device location of the consumer devices, click stream activity and past transaction data of the consumers;

wherein the pre-feature duration corresponds to a first period of time prior to a first day that the promotion is launched in the full distribution, wherein the pre-feature impression of the promotion comprises a set of email impressions of the promotion that were distributed by a promotion and marketing service to the selected subset of consumer devices during the pre-feature duration in the limited distribution of the promotion prior to the full distribution of the promotion, in a custom configuration based on a ranking of the promotion, wherein the ranking includes varied graphical interface positioning specific to a user interface of a consumer device and for display on a display of the user interface, and the email impressions include a layout of a set of graphics with the graphic that is for display at position 1 in the layout being for display larger than the other graphics, at a top of the display and representing a featured deal;

wherein the pre-feature data comprises data collected from the set of email impressions, wherein the pre-feature data further comprises responses from the selected subset of consumers to the pre-feature impression of the promotion, and wherein the pre-feature data further comprises a number of pre-feature sales resulting from the pre-feature impression of the promotion, wherein the pre-feature sales comprise sales during both the limited distribution of the promotion and during the full distribution of the promotion which both result from the pre-feature impression emailed to the selected subset of consumers during the pre-feature duration in the limited distribution of the promotion;

generating, by the processor, an estimated sales velocity for the promotion by applying a portion of the pre-feature sales data associated with the selected subset of consumers to the machine learning odds model, wherein the estimated sales velocity is a predicted number of sales per day over a promotion duration, wherein the promotion duration corresponds to a second period of time that begins on the first day that the promotion is launched in the full distribution, wherein the estimated sales velocity is based at least on the number of pre-feature sales and a velocity multiplier that is a function of a promotion price and the promotion duration, and wherein the machine learning odds model comprises a scaling parameter that corrects for quantity of the pre-feature sales based on an email-only-attributed quantity of the pre-feature sales data and a total quantity of the goods being offered during the first period of time; and determining, by the processor, the quantity of goods to source by the promotion and marketing service inventory based on the estimated sales velocity.

2. The method of claim 1, comprising a demographic analysis of the selected subset of consumers to whom the pre-feature impression was distributed.

3. The method of claim 1, wherein the pre-feature impression of the promotion is included in a set of pre-feature impressions that are distributed as content describing available promotions.

4. The method of claim 3, wherein the content is email content.

5. The method of claim 1, wherein the selected subset of consumers to which the pre-feature impression of the promotion is distributed during the pre-feature duration is a subset of a set of consumers to which the promotion is distributed during the promotion duration.

6. A computer program product, stored on a computer readable medium, comprising instructions that when executed on one or more computers cause a processor of a pre-feature analysis module to perform operations implementing determining a quantity of goods to source for a promotion offering the goods for purchase, the operations comprising:

adaptively training a machine learning odds model based on historical sales velocity data until tuning criteria for the machine learning odds model is satisfied, wherein the historical sales velocity data corresponds to a historical number of sales per day over one or more promotion durations;

receiving, from an impressions data repository, pre-feature data describing a pre-feature impression of the promotion that was distributed to a selected subset of consumer devices associated with a selected subset of consumers based on at least one of attributes of the promotion and attributes of the consumers during a pre-feature duration in a limited distribution of the promotion to only the selected subset of consumers, pre-launch and prior to a full distribution of the promotion, wherein the promotion is indicative of a promotional value that upon purchase or acceptance results in issuance of an instrument configured to be used toward at least a portion of the purchase of the goods defined by the promotion;

wherein the promotion is optimized based on the attributes of the consumers and the attributes of the promotion by being selected based on at least one of type of goods being offered, promotion price, offered discount, gender of the consumers, device location of the consumer devices, click stream activity and past transaction data of the consumers;

wherein the pre-feature duration corresponds to a first period of time prior to a first day that the promotion is launched in the full distribution, wherein the pre-feature impression of the promotion comprises a set of email impressions of the promotion that were distributed by a promotion and marketing service to the selected subset of consumer devices during the pre-feature duration in the limited distribution of the promotion prior to the full distribution of the promotion, in a custom configuration based on a ranking of the promotion, wherein the ranking includes varied graphical interface positioning specific to a user interface of a consumer device and for display on a display of the user interface, and the email impressions include a layout of a set of graphics with the graphic that is for display at position 1 in the layout being for display larger than the other graphics, at a top of the display and representing a featured deal;

wherein the pre-feature data comprises data collected from the set of email impressions, wherein the pre-feature data further comprises responses from the selected subset of consumers to the pre-feature impression of the promotion and wherein the pre-feature data further comprises a number of pre-feature sales resulting from the pre-feature impression of the promotion, wherein the pre-feature sales comprise sales during both the limited distribution of the promotion and during the full distribution of the promotion which both result from the pre-feature impression emailed to the selected subset of consumers during the pre-feature duration in the limited distribution of the promotion;

generating an estimated sales velocity for the promotion by applying a portion of the pre-feature sales data associated with the selected subset of consumers to the machine learning odds model, wherein the estimated sales velocity is a predicted number of sales per day over a promotion duration, wherein the promotion duration corresponds to a second period of time that begins on the first day that the promotion is launched in the full distribution, wherein the estimated sales velocity is based at least on the number of pre-feature sales and a velocity multiplier that is a function of a promotion price and the promotion duration, and wherein the machine learning odds model comprises a scaling parameter that corrects for quantity of the pre-feature sales based on an email-only-attributed quantity of the pre-feature sales data and a total quantity of the goods being offered during the first period of time; and determining the quantity of goods to source by the promotion and marketing service inventory based on the estimated sales velocity.

7. The computer program product of claim 6, wherein the operations further comprise a demographic analysis of the selected subset of consumers to whom the pre-feature impression was distributed.

8. The computer program product of claim 6, wherein the pre-feature impression of the promotion is included in a set of pre-feature impressions that are distributed as content describing available promotions.

9. The computer program product of claim 8, wherein the content is email content.

10. A system comprising:
one or more computers and one or more storage devices storing instructions that are operable, when executed by the one or more computers, to cause a processor of a pre-feature analysis module to perform operations implementing determining a quantity of goods to source for a promotion offering the goods for purchase, the operations comprising:
adaptively training a machine learning odds model based on historical sales velocity data until tuning criteria for the machine learning odds model is satisfied, wherein the historical sales velocity data corresponds to a historical number of sales per day over one or more promotion durations;
receiving, from an impressions data repository, pre-feature data describing a pre-feature impression of the promotion that was distributed to a selected subset of consumer devices associated with a selected subset of consumers based on at least one of attributes of the promotion and attributes of the consumers during a pre-feature duration in a limited distribution of the promotion to only the selected subset of consumers, pre-launch and prior to a full distribution of the promotion, wherein the promotion is indicative of a promotional value that upon purchase or acceptance results in issuance of an instrument configured to be used toward at least a portion of the purchase of the goods defined by the promotion;
wherein the promotion is optimized based on the attributes of the consumers and the attributes of the promotion by being selected based on at least one of type of goods being offered, promotion price, offered discount, gender of the consumers, device location of the consumer devices, click stream activity and past transaction data of the consumers;
wherein the pre-feature duration corresponds to a first period of time prior to a first day that the promotion is launched in the full distribution,
wherein the pre-feature impression of the promotion comprises a set of email impressions of the promotion that were distributed by a promotion and marketing service to the selected subset of consumer devices during the pre-feature duration in the limited distribution of the promotion prior to the full distribution of the promotion, in a custom configuration based on a ranking of the promotion, wherein the ranking includes varied graphical interface positioning specific to a user interface of a consumer device and for display on a display of the user interface, and the email impressions include a layout of a set of graphics with the graphic that is for display at position 1 in the layout being for display larger than the other graphics, at a top of the display and representing a featured deal;
wherein the pre-feature data comprises data collected from the set of email impressions,
wherein the pre-feature data further comprises responses from the selected subset of consumers to the pre-feature impression of the promotion and
wherein the pre-feature data further comprises a number of pre-feature sales resulting from the pre-feature impression of the promotion, wherein the pre-feature sales comprise sales during both the limited distribution of the promotion and during the full distribution of the promotion which both result from the pre-feature impression emailed to the selected subset of the consumers during the pre-feature duration in the limited distribution of the promotion;
generating an estimated sales velocity for the promotion by applying a portion of the pre-feature sales data associated with the selected subset of consumers to the machine learning odds model,
wherein the estimated sales velocity is a predicted number of sales per day over a promotion duration,
wherein the promotion duration corresponds to a second period of time that begins on the first day that the promotion is launched in the full distribution,
wherein the estimated sales velocity is based at least on the number of pre-feature sales and a velocity multiplier that is a function of a promotion price and the promotion duration, and
wherein the machine learning odds model comprises a scaling parameter that corrects for quantity of the pre-feature sales based on an email-only-attributed quantity of the pre-feature sales data and a total quantity of the goods being offered during the first period of time; and
determining the quantity of goods to source by the promotion and marketing service inventory based on the estimated sales velocity.

11. The system of claim 10, wherein the operations further comprise a demographic analysis of the selected subset of consumers to whom the pre-feature impression was distributed.

12. The system of claim 10, wherein the pre-feature impression of the promotion is included in a set of pre-feature impressions that are distributed as content describing available promotions.

13. The system of claim 12, wherein the content is email content.

* * * * *